T. T. HILL.
HORSE BLANKET.
APPLICATION FILED JULY 8, 1915.

1,159,495.    Patented Nov. 9, 1915.

Witnesses

Inventor
Thomas T. Hill.
By
Attorney

UNITED STATES PATENT OFFICE.

THOMAS TEMPLE HILL, OF CULPEPER, VIRGINIA.

HORSE-BLANKET.

1,159,495.  Specification of Letters Patent.  Patented Nov. 9, 1915.

Application filed July 8, 1915. Serial No. 38,679.

*To all whom it may concern:*

Be it known that I, THOMAS T. HILL, a citizen of the United States, residing at Culpeper, county of Culpeper, and State of Virginia, have invented certain new and useful Improvements in Horse-Blankets, of which the following is a specification.

This invention relates to covers for animals, and more particularly to such devices commonly used for covering horses.

The primary object of the device is to provide a cover which may be secured upon the body of the animal with but little effort on the part of the attendant, and which will insure against the cover becoming accidentally detached from the body of the animal.

A further object of the invention is to provide a cover for animals capable of being easily and quickly applied to the body of the animal, insuring a snug fit of the cover to the body of the animal, and which is of such construction as to prevent the cover from slipping out of position or shape while on the body of the animal.

A still further object of the invention is to provide a cover of the character described which is so arranged as to prevent sliding of the cover forward or rearward upon the body of the animal.

With these objects in view, together with others which will appear as the description proceeds, the invention resides in the novel combination and arrangement of parts all as will be described more fully hereinafter and particularly pointed out in the claims.

The invention will be better understood by reference to the accompanying drawings, wherein—

Figure 1:
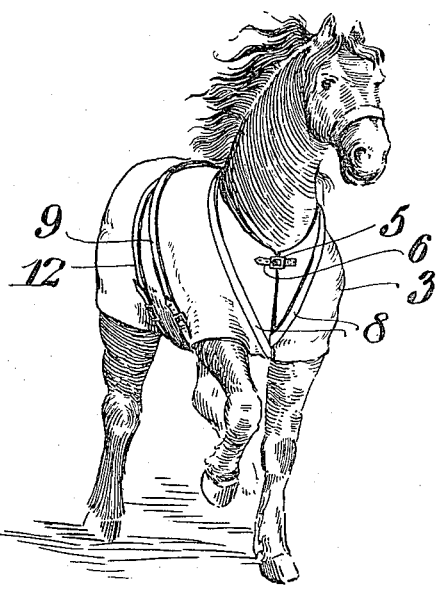
Figure 2:
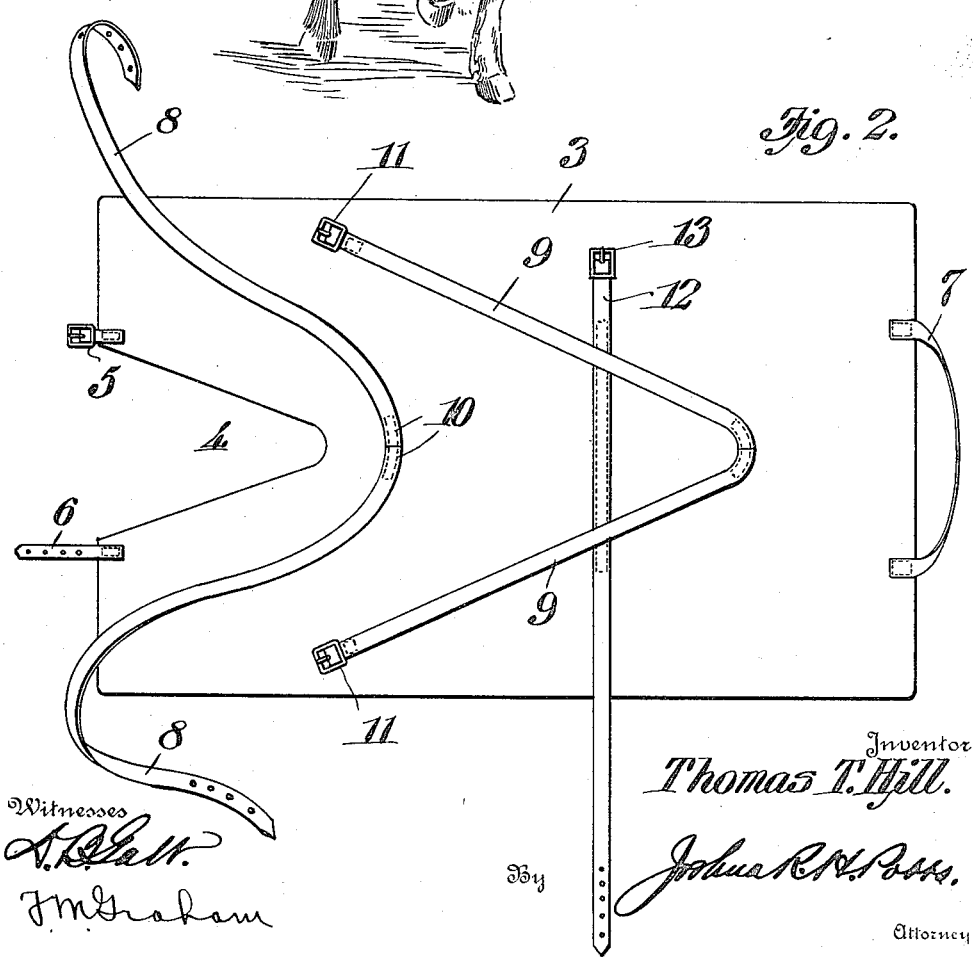

Figure 1 is a perspective view of a horse illustrating the application of a cover constructed in accordance with my invention, and Fig. 2 is an enlarged plan view of the improved cover.

Referring now more particularly to the drawing, 3 represents generally the body of the cover or blanket, the same being formed of any approved material. The cover or blanket 3 is shaped so as to lend itself to conform to the shape of the body of the animal on which it is desired to use the same, the usual rectangular shaped blanket being employed in the present instance. The blanket or cover is cut away as at 4 adjacent its forward edge to provide a neck engaging portion, and conventional securing elements 5 and 6 are provided upon the said forward edge for the purpose of securing the forward edges of the blanket or cover across the breast of the animal. A strap or tape 7 is secured at its opposite ends in such position upon the rear edge of the body of the cover as to engage against the rear legs of the animal to prevent the cover from riding or sliding forward upon the body of the animal.

The inventive characteristics reside in the arrangement of girths upon the body of the cover or blanket to hold the same securely in position, to insure a snug fit of the blanket to the different parts of the body of the animal, to prevent the cover from sliding rearwardly, forwardly or sidewise, to render the same readily applicable to the body of the animal, and to distribute the strain incident to the application or adjustment of blankets of this character to the bodies of animals to different parts of the cover or blanket, thus rendering the same most durable and efficient. In attaining these ends I provide girths, bands or straps 8 of suitable material secured at one end adjacent the forward end of the blanket or cover and adapted upon application of the same to the animal to be crossed upon the breast of the animal and to be passed one behind each of the fore legs of the animal to be secured to the forward ends of certain other girths or straps 9 secured at one end near the rear end of the cover and extending forwardly therefrom in such direction as to be conveniently engaged or connected at their free or forward ends to the ends of the girths 8. In practice the girths 8 are stitched or in any other preferred manner secured at 10 to the body of the cover slightly to the rear of the cutaway portion or neck yoke 4, and preferably mid-way between the lateral edges of the cover or blanket. The second or rear girths 9 are in a similar manner secured at one end adjacent the rear end of the blanket and preferably mid-way between the lateral edges thereof, and extend outwardly and forwardly in such manner that their ends may lie in convenient position for engagement with the ends of the girths 8. The girths 9 are provided at their free ends with conventional buckles 11 for engagement with the ends of the girths 8, and it will be observed that the buckles 11 when the device is in use will be positioned slightly to the rear of the fore legs of the animal. To secure the blanket or cover further against movement upon the body of the animal and to insure a snug and comfortable fit, a strap or band 12 is provided for encircling the body of the animal in the same capacity as the usual belly band. This band may be stitched or in any other preferred manner secured to the body of the cover in transverse relation, being of sufficient length to extend entirely around the body of the animal and to be engaged within a buckle 13 provided upon its opposite end.

By the arrangement set forth it will be observed that a most practical horse blanket or cover is provided. The unique arrangement of the girths 8 and 9 insure a snug and comfortable fit of the blanket to the animal, absolutely preventing derangement of the same upon the body of the animal. Moreover, the girths are so positioned upon the blanket body as to obviate the chafing common to the use of straps in connection with covers or blankets generally used.

I claim:—

1. A cover for animals comprising a blanket, a plurality of girths on said blanket for securing the latter to the body of an animal, one of said girths being secured to the said blanket adjacent the forward end thereof and adapted to be passed forwardly and downwardly across the breast of and behind the opposite fore leg of the animal, and means upon the opposite sides of said blanket for securing the ends of said girth, substantially as described.

2. A cover for animals comprising a blanket, a pair of girths each secured at one end to said blanket adjacent the forward end thereof with its free end projecting forwardly from one side of said blanket, a second pair of girths each secured at one end near the rear of said blanket with its free end extending along one side of said blanket forwardly and downwardly and terminating near the lateral edges of said blanket inwardly from the forward edges thereof, the said blanket being adapted to be positioned upon the body of an animal with the said first named girths crossed upon the breast of and passed behind the opposite fore legs of the said animal to terminate adjacent the free ends of said second girths, and coöperating means on the free ends of said first and second girths for securing the same together, substantially as described.

3. A cover for animals comprising a blanket of substantially rectangular shape and being cut away at its forward end to provide a neck inclosing portion, girths secured at one end to said blanket adjacent the inner edge of said neck portion and extending forwardly and outwardly one on each side of said neck portion, a second pair of girths each secured at one end to said blanket adjacent the rear end thereof and extending outwardly and forwardly one on each side of said blanket and terminating inwardly from the forward edge of said blanket, coöperating fastening means on the end of said first and second girths for securing the same together, a band secured intermediate the front and rear ends of said blanket and extending transversely thereof to encircle the body of an animal, and a strap connected at its opposite ends to opposite sides of said blanket at the rear edge thereof, substantially as described.

In testimony whereof I have signed my name to this specification in the presence of two subscribing witnesse.

THOMAS TEMPLE HILL.

Witnesses:
F. H. WHITE,
ROBERT BULTON.

Copies of this patent may be obtained for five cents each, by addressing the "Commissioner of Patents, Washington, D. C."